US012577352B2

(12) United States Patent
Walker et al.

(10) Patent No.: US 12,577,352 B2
(45) Date of Patent: Mar. 17, 2026

(54) ORGANOPOLYSILOXANE CLUSTER POLYMER FOR RAPID AIR UV CURE

(71) Applicants: Dow Global Technologies LLC, Midland, MI (US); Dow Silicones Corporation, Midland, MI (US)

(72) Inventors: James A. Walker, Midland, MI (US); Junying Liu, Midland, MI (US); Patrick S. Hanley, Auburn, MI (US); Ryan Thomas, Auburn, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 497 days.

(21) Appl. No.: 17/927,400

(22) PCT Filed: Aug. 30, 2021

(86) PCT No.: PCT/US2021/048160

§ 371 (c)(1),
(2) Date: Nov. 23, 2022

(87) PCT Pub. No.: WO2022/051203

PCT Pub. Date: Mar. 10, 2022

(65) Prior Publication Data

US 2023/0242712 A1 Aug. 3, 2023

Related U.S. Application Data

(60) Provisional application No. 63/072,973, filed on Sep. 1, 2020.

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08G 77/08*** | (2006.01) |
| ***C08G 77/12*** | (2006.01) |
| ***C08G 77/18*** | (2006.01) |
| ***C08G 77/20*** | (2006.01) |
| ***C09D 183/06*** | (2006.01) |

(52) U.S. Cl.

CPC ............. *C08G 77/20* (2013.01); *C08G 77/08* (2013.01); *C08G 77/12* (2013.01); *C08G 77/18* (2013.01); *C09D 183/06* (2013.01)

(58) Field of Classification Search

CPC ............... C08F 2/46; C08F 2/50; C08G 61/04
USPC ................. 522/99, 71, 189, 184, 6, 1; 520/1
See application file for complete search history.

(56) References Cited

U.S. PATENT DOCUMENTS 5,516,812 A 5/1996 Chu et al.
5,614,640 A * 3/1997 Okawa .................. C07F 7/0838 549/215
6,451,870 B1 9/2002 DeCato et al.
8,618,233 B2 12/2013 Alvarez et al.
9,593,209 B2 3/2017 Dent et al.
10,280,265 B2 5/2019 Eldred et al.
2006/0074212 A1 4/2006 Chapman et al.
2015/0243858 A1* 8/2015 Okawa ................. C09D 183/14 524/413
2015/0376476 A1 12/2015 Rahim et al.
2016/0108066 A1 4/2016 Goto
2017/0335109 A1 11/2017 Sarkar et al.
2023/0174723 A1* 6/2023 Thomas ................. C08G 77/20 525/479

FOREIGN PATENT DOCUMENTS

GB 2515337 A * 12/2014 .......... C08F 290/148
WO 2011056832 5/2011
WO 2014124362 8/2014
WO 2014124388 8/2014
WO 2019084397 5/2019
WO 2020142443 7/2020

OTHER PUBLICATIONS

International Search Report and Written Opinion for corresponding International Application No. PCT/US2021/048160 dated Jan. 4, 2022.

* cited by examiner

*Primary Examiner* — Jessica Whiteley
(74) *Attorney, Agent, or Firm* — Steven W. Mork

(57) ABSTRACT

A composition contains a cluster organopolysiloxane having the following structure:

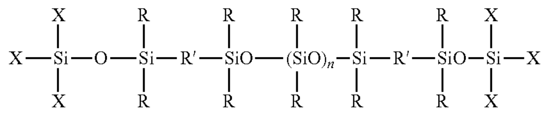

where:

X =
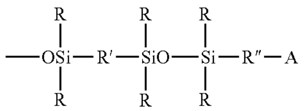

and R is independently in each occurrence selected from a group consisting of aryl groups and alkyl groups having from 2 to 6 carbons; R' and R" are independently in each occurrence selected from divalent hydrocarbon groups containing from 2 to 6 carbon atoms; n is a value in a range of 50 to less than 200; and A is independently in each occurrence selected from a group consisting of acrylate, methacrylate and trialkoxysilyl groups; provided that, on average, 50 to 95 mole-percent of the A groups are selected from acrylate and methacrylate groups and 5 to 50 mole-percent of the A groups are selected from trialkoxysilyl groups.

11 Claims, No Drawings

ORGANOPOLYSILOXANE CLUSTER POLYMER FOR RAPID AIR UV CURE

FIELD OF THE INVENTION

The present invention relates to an organopolysiloxane cluster polymer, curable compositions comprising the organopolysiloxane cluster polymer and articles comprising such curable compositions in cured or uncured form.

Introduction

Acrylate or methacrylate ("(meth)acrylate") functional organopolysiloxanes can be useful for participating in free radical polymerization reactions. Curing of (meth)acrylate functional organopolysiloxanes can be initiated by ultraviolet ("UV") light with UV radical initiators. When combined with alkoxysilyl functionality, or other organopolysiloxanes having alkoxysilyl functionality, (meth)acrylate functional organopolysiloxanes can be part of a dual cure composition that partially cures by UV-induced free radical induced polymerization through the (meth)acrylate group and by moisture curing through the alkoxysilyl functionality. The free radical induced polymerization is often used to rapidly achieve an initial cure of the surface of a composition. Free radical polymerization is particularly desirably to obtain a dry, tack-free surface quickly to preclude damage or contamination of the composition or contacting object upon contact while other portions of the composition can moisture cure over a longer time. It is particularly desirable to identify a UV/moisture dual cure composition that achieves UV curing to achieve a dry, tack-free surface in less than 30 seconds when exposed to 4 Joules per square centimeter of UV light.

A challenge with free radical curing of (meth)acrylate functional organopolysiloxanes is oxygen inhibition. When conducting a radical polymerization reaction in the presence of oxygen, such as when the reaction is run in air, oxygen interferes with the free radical polymerization of the (meth) acrylate. As a result, radical curing by free radical reaction of (meth)acrylate groups in air typically results in wet and/or tacky composition surfaces due to slow and/or insufficient free radical curing of the surface of the composition. Compositions that are cured by free radical polymerization of (meth)acrylate groups typically require a blanket of inert gas or other measures to preclude oxygen from interfering with the reaction.

It is desirable to identify an organopolysiloxane that has both (meth)acrylate functionality for UV-induced free radical polymerization and alkoxysilyl functionality for moisture curing that can be used in a dual curing composition, and that facilitates curing the composition by free radical polymerization of (meth)acrylate groups to result in a dry and tack-free surface in 30 seconds or less, preferably 20 seconds or less, and more preferably 15 seconds or less when cured by 4 Joules per square centimeter of UV light in air.

BRIEF SUMMARY OF THE INVENTION

The present invention provides an organopolysiloxane that has both (meth)acrylate functionality for UV-induced free radical polymerization and alkoxysilyl functionality for moisture curing that can be used in a dual curing composition, and that facilitates curing the composition by free radical polymerization of (meth)acrylate groups to result in a dry and tack-free surface in 30 seconds or less, preferably 20 seconds or less, and more preferably 15 seconds or less when cured by 4 Joules per square centimeter of UV light in air.

The present invention is a result of discovering a cluster organopolysiloxane that contains terminal functionalities of which 50-95 mole-percent (mol %) are selected from acrylate and methacrylate groups and 5-50 mol % of the terminal functionalities, are trialkoxysilyl groups. Desirably, all of the terminal functionalities are selected from acrylate, methacrylate and trialkoxysilyl groups. Surprisingly, compositions comprising this cluster organopolysiloxane in combination with free UV radical initiators cure to a dry and tack-free surface in air in 30 seconds or less, even 20 seconds or less, or even 15 seconds or less when exposed to 4 Joules per square centimeter of UV light and can work as a dual curing reactive polymer when a moisture cure catalyst is also present.

In a first aspect, the present invention is a composition comprising a cluster organopolysiloxane having the following structure:

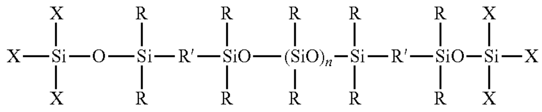

where:

X =
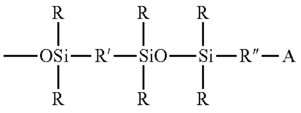

and R is independently in each occurrence selected from a group consisting of aryl groups and alkyl groups having from 2 to 6 carbons; R' and R" are independently in each occurrence selected from divalent hydrocarbon groups containing from 2 to 6 carbon atoms; the average n value for a sample is a value in a range of 50 to less than 200; and A is independently in each occurrence selected from a group consisting of acrylate, methacrylate and trialkoxysilyl groups; provided that, on average, 50 to 95 mole-percent of the A groups are selected from acrylate and methacrylate groups and 5 to 50 mole-percent of the A groups are selected from trialkoxysilyl groups.

The composition can and desirably does further comprise a UV free radical initiator and can further yet comprise a moisture cure catalyst. The composition, when containing a radical initiator and/or moisture cure catalyst, is a curable composition.

In a second aspect, the present invention is a method of using a curable composition of the first aspect comprising applying the composition to a surface of a substrate and curing the composition to form an article comprising cured composition.

In a third aspect, the present invention is an article comprising a composition of the first aspect on a surface of a substrate. Desirably the composition is a curable composition and the article comprises the composition in a cured state.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Alkyl group" refers to an alkane having one hydrogen replaced with a bond to the atom to which the alkyl group is attached.

"Acrylate group" refers to a group having the following structure: $—O—C(=O)—CH=CH_2$ "Methacrylate group" refers to a group having the following structure: $—O—C(=O)—C(CH_3)=CH_2$.

"(Meth)acrylate" means "methacrylate or acrylate"

"Trialkoxysilyl group" refers a trialkoxysilane ($HSi(OR)_3$) with the hydrogen bound to the silicon atom replaced with a bond to the atom to which the trialkoxysilyl group is attached: $—Si(OR)_3$, where R is an alkyl group attached to the oxygen.

Evaluate whether a composition has cured to form a dry tack-free surface by wiping the surface of the cured composition with a finger in a nitrile glove and determining if any of the composition adheres to the nitrile gloved finger. If there is composition on the nitrile gloved finger after wiping the cured composition then the composition is not considered dry and tack-free. However, if no composition is on the nitrile gloved finger after wiping the cured composition then the composition is considered dry and tack-free. Specific test methods for UV cured samples are in the Examples section, below.

Cluster Organopolysiloxane

The present invention is a composition that comprises (and can consist of) a cluster organopolysiloxane having the following Structure (I):

(I)

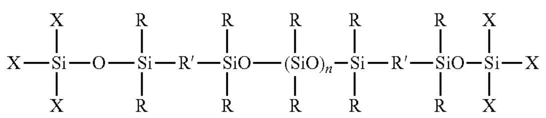

where:

(a)

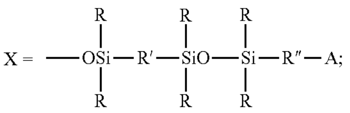

(b) R is independently in each occurrence selected from a group consisting of aryl groups and alkyl groups having from 2 to 6 carbons, preferably R is methyl;

(c) R' and R" are independently in each occurrence selected from divalent hydrocarbon groups containing from 2 to 6 carbon atoms, preferably divalent linear hydrocarbon groups, more preferably divalent linear hydrocarbon groups containing 2 carbon atoms ($—(CH_2)_2—$) or 3 carbon atoms ($—(CH_2)_3—$);

(d) the average n value for a sample n is a value in a range of 50 to less than 200, and can be 50 or more 75 or more, 100 or more, 110 or more, 125 or more, 150 or more, even 175 or more, while at the same time is typically less than 200 or less, and can be 190 or less, 180 or less, 170 or less, 160 or less, 150 or less, 125 or less, 110 or less, even 100 or less; and (e) A is independently in each occurrence selected from a group consisting of acrylate groups, methacrylate groups and trialkoxysilyl groups. On average, 50 mol-percent (mol %) or more, or 55 mol % or more, 60 mol % or more, 65 mol % or more, 70 mol % or more, 75 mol % or more, 80 mol % or more, 85 mol % or more, even 90 mol % or more while at the same time 95 mol % or less, or 90 mol % or less, 85 mol % or less, 80 mol % or less, 75 mol % or less, 70 mol % or less, 65 mol % or less or even 60 mol % or less of the A groups are selected from acrylate and methacrylate groups. At the same time, 5 mol % or more, an possibly 10 mol % or more, 15 mol % or more, 20 mol %, 25 mol % or more, 30 mol % or more, 35 mol % or more, 40 mol % or more, even 45 mol % or more while at the same time 50 mol % or less, and possibly 45 mol % or less, 40 mol % or less, 35 mol % or less, 30 mol % or less, 25 mol % or less, 20 mol % or less, 15 mol % or less or even 10 mol % or less of the A groups are trialkoxysilyl groups. Desirably, when A is a trialkoxysilyl group the alkoxy groups of the trialkoxysilyl are selected from a group consisting of methoxy, ethoxy and propoxy groups.

Desirably, R' is $—(CH_2)_2—$ and additionally R" is $—(CH_2)_3—$ when connected to an A group that is acrylate or methacrylate and $—(CH_2)_2—$ when connected to an A group that is trialkoxysilyl. It is further desirable for the alkoxy group of trialkoxysilyl groups to be methoxy.

The cluster organopolysiloxane is a dumbbell structure with a linear polysiloxane chain separating terminal groups each with three terminal functional groups. The terminal functional groups are selected from acrylate groups, methacrylate groups and trialkoxysilyl groups in the aforementioned concentration ranges. Surprisingly, formulations containing this cluster organopolysiloxane and a radical initiator undergoes radical curing in air that can result in a dry, tack-free surface when cured in air under UV light exposure of 4 Joules per square centimeter for 30 seconds or less, even 20 seconds or less, or even 15 seconds or less.

It has been discovered that when less than 50 mol %, on average, of the A groups in the cluster organopolysiloxane are selected from acrylate and methacrylate groups then the curable composition does not cure to a dry, tack-free surface when cured under UV light exposure of 4 Joules per square centimeter for 30 seconds or less.

If the cluster organopolysiloxane contains only acrylate and/or methacrylate groups for the A groups then it is not capable of undergoing moisture cure, which requires some of the A groups to have alkoxysilyl functionality as provided by trialkoxysilyl groups. Hence, when 95 mol % or more of the A groups of the cluster organopolysiloxane are selected from acrylate and methacrylate groups the cluster organopolysiloxane will not undergo effective dual curing by both radical and moisture curing. The cluster organopolysiloxane must contain some trialkoxysilyl groups to serve as both a UV and moisture curable component.

The cluster organopolysiloxane can be synthesized by a 2-step hydrosilylation reaction process. The first step (Step 1) is to react a linear hydrogen terminated polyorganosiloxane having structure (II) with an excess molar concentration of a vinyl functionalized neopentamer having structure (III) in the presence of a platinum catalyst and heat to produce a functionalized linear organopolysiloxane of structure (IV):

$$HR_2SiO—(SiR_2O)_n—SiR_2H \quad (II)$$

$$(R_2R'^{a}SiO)_4SiO \quad (III)$$

$$(R_2R'^{a}SiO)_3SiO—SiR_2—R'—SiR_2O—(SiR_2O)_n—OSiR_2—R'—SiR_2—OSi(OSiR'^{a}R_2)_3 \quad (IV)$$

where R, R' and n are as described above and $R'^{a}$ corresponds to a monovalent terminally unsaturated precursor to R' formed by removing a hydrogen from a carbon adjacent to a terminal carbon of R' and forming a double bond between that carbon and the terminal carbon. For instance $R'^{a}$ for an R' that contains two carbon atoms is a vinyl group ($—CH═CH_2$) and $R'^{a}$ for an R' that is $—CH_2CH_2CH_2—$ is group having the following structure: $—CH_2—CH═CH_2$.

The second step (Step 2) is to react the product of Step 1 containing the linear organopolysiloxane of structure (IV) with functionalized disiloxanes having the molecular structure of structure (V):

$$HR_2Si—O—SiR_2—R''-A \quad (V)$$

in the presence of platinum catalyst and heat to produce a reaction product that comprises the cluster organopolysiloxane of the present invention, where R, R" and A are as described previously.

Oligomers and by-Products

Step 2 of the synthesis typically follows Step 1 of the 2-step synthesis without isolating the functionalized linear organopolysiloxane of structure (IV). Therefore, the excess vinyl functionalized neopentamer is present with the linear organopolysiloxane of structure (IV) and also undergoes further reactions during Step 2 to form oligomers. It is common for the reaction product of Step 2 of the synthesis to have up to 25 weight-percent (wt %) oligomers relative to weight of the sum of oligomers and cluster organopolysiloxane. In fact, often the reaction product of Step 2 comprises 10 wt % or more, 15 wt % or more, even 20 wt % or more oligomers while at the same time typically contains 25 wt % or less oligomers relative to the sum of oligomers and cluster organopolysiloxane. The oligomers can be or comprise compounds having the following molecular structure:

$$Si(—OSiR_2—R'—SiR_2OSi(R_2)—R''-A)_4$$

where R, R" and A are as previously described.

A by-product that can be present in addition to or instead of the oligomers in the reaction product is a form of cluster organpolysiloxane of Structure (I) where not all of the $R'^{a}$ groups of structure (IV) are consumed in the Step 2 reaction. Such a by-product has X groups that have the structure X', where:

$$X'=—OSiR_2—R'^{a}$$

where R, R' and $R'^{a}$ are as described above. Typically, the by-product contains an average based on total moles of X groups of 5 mol % or less, preferably 4 mol % or less, 3 mol % or less, 2 mol % or less, one mol % or less and can be free of X groups that have X' structures. AT the same time, such a by-product is typically present at a concentration of 5 mol % or less, preferably 4 mol % or less, 3 mol % or less, 2 mol % or less, one mol % or less and can be absent from the reaction product altogether, where mol % is relative to moles of components in the reaction product.

The composition of the present invention can be or comprise the reaction product of the 2-step reaction for making the cluster organopolysiloxane, including the cluster organopolysiloxane and any oligomers and/or by-products that might be present.

Curable Composition

The composition of the present invention can be a curable composition that comprises an ultraviolet (UV) light activated free radical initiator in addition to the cluster organopolysiloxane and other components. Examples of suitable ultraviolet light activated initiators include 2-hydroxy-2-methylpropiophenone, diethoxyacetophenone, benzoin methyl ether, benzoin ethyl ether, benzoin isopropyl ether, diethoxyxanthone, chloro-thioxanthone, azobisisobutyronitril, N-methyl diethanolaminebenzophenone 4,4'-bis(dimethylamino)benzophenone, diethoxyacetophenone, 2,2-dimethoxy-1,2-diphenylethan-1-one, 1-hydroxycyclohexylphenylketone, 2-hydroxy-2-methyl-1-phenylpropan-1-one, 2-methyl-1-[4-(methylthio)phenyl]-2-morpholinopropan-1-one, 1-[4-(2-hydroxyethoxy)phenyl]2-morpholinopropan-1-one, 2-benzyl-2-dimethylamino-1-(4-morpholinophenyl)butan-1-one, bis(2,4,6-trimethylbenzoyl)phenylphosphine oxide, and combinations thereof. When a UV light activated initiator is present, it is typically present at a concentration of 0.1 wt % or more, even one wt % or more while at the same time is typically 10 wt % or less, or even 3 wt % or less based on weight of the composition.

UV curable compositions of the present invention surprisingly cures in air to form a dry tack-free surface upon exposure of 4 Joules per square centimeter of UV light in air in 30 seconds or less, or even 20 seconds or less, or even 15 seconds or less.

The curable compositions can further comprise a moisture cure catalyst to form a dual cure composition. The moisture cure catalyst facilitates moisture induced curing of the alkoxysilyl groups on the cluster organopolysiloxane, which can occur in addition to UV light induced curing. Suitable moisture cure catalysts include titanium (IV) isopropoxide, titanium (IV) n-butoxide, titanium (IV) t-butoxide, titanium (IV), titanium di(isopropoxy)bis(ethylacetoacetate), titanium di(isopropoxy)bis(methylacetoacetate), titanium di(isopropoxy)bis(acetylacetonate), zirconium (IV) isopropoxide, zirconium (IV) n-butoxide, zirconium (IV) t-butoxide, zirconium di(isopropoxy)bis(ethylacetoacetate), zirconium di(isopropoxy)bis(methylacetoacetate), zirconium di(isopropoxy)bis(acetylacetonate, dimethyltin dineodecanoate, dibutyltin dilaurate, dibutyltin dioctoates, and stannous octoate and any combinations thereof.

Method of Using Curable Composition

The curable compositions of the present invention can be used in many different applications including as an adhesive, a sealant or as a coating. In such applications, the use of the composition comprises the steps of applying the composition to a substrate and then curing the composition to form an article having the cured composition on the substrate. For instance, the method may comprise applying the curable composition to a substrate an subjecting the composition on the substrate to UV light.

Optional Components

Compositions of the present invention can optionally comprise or be free of any one or combination of more than one optional component. The is, the compositions can comprise or be free of any category of optional component or can comprise or be free of any specific material that falls within a category of an optional component. Optional component categories include alkenyl-functional alkoxy-free organopolysiloxanes; (ii) alkyl trialkoxy silanes; (iii) radical scavengers; and (iv) fillers.

Alkenyl-functional alkoxy-free organopolysiloxanes can be desirable in the composition to speed UV light triggered radical curing reactions and to adjust final mechanical properties of the cured composition. For instance, including long-chain alkenyl-functional alkoxy-free organopolysiloxanes such as a long chain polydimethylsiloxane terminally capped with alkenyl (such as vinyl) can increase the elongation at break for the final cured composition. Examples of alkenyl-functional alkoxy-free organopolysiloxanes include polydimethylsiloxane capped on one or both ends with alkenyl such as vinyl. Alkenyl-functional alkoxy-free organopolysiloxanes can be present at a concentration of zero wt % or more, 5 wt % or more 10 wt % or more, even 15 wt % or more while at the same time is typically present at a concentration of 50 wt % or less, 40 wt % or less, 30 wt % or less, 20 wt % or less, even 10 wt % or less with wt % relative to composition weight.

Alkyl trialkoxy silanes can be desirable in the composition as crosslinkers. Crosslinkers can strengthen, toughen and/or make more rigid the composition after curing. Examples of suitable alkyl trialkoxy silanes include those having alkyl group with one to 6 carbon atoms and alkoxy groups with one to 6 carbon atoms. Suitable alkyl trialkoxy silanes include methyl trimethoxy silane, ethyl trimethoxy silane, propyl trimethoxy silane, butyl trimethoxy silane, methyl triethoxy silane, methyl tripropoxy silane, ethyl triethoxy silane and ethyl tripropoxy silane. Alkyl trialkoxy silanes can be present at a concentration of zero wt % or more, 0.1 wt % or more, 0.5 wt % or more, 1.0 wt % or more, 2.0 wt % or more, even 5.0 wt % or more while at the same time are typically present at a concentration of 10 wt % or less, 8 wt % or less, 5 wt % or less, 4 wt % or less, 3 wt % or less, 2 wt % or less or even 1.0 wt % or less with wt % relative to composition weight.

Radical scavengers can be desirable to enhance shelf life of a composition. Examples of suitable radical scavengers include any one or combination of more than one of butylated hydroxytoluene (BHT), 4-methoxyphenol, tert-butylhydroquinone, 6-tert-butyl-2,4-xylenol, 2-tert-butyl-1,4-benzoquinone, 4-tert-butylpyrocatechol, and 2,6-di-tert-butylphenol. Radical scavengers can be present at a concentration of zero wt % or more, 0.1 wt % or more, 0.5 wt % or more, 1.0 wt % or more, even 2.0 wt % or more while at the same time are typically present at a concentration of 3.0 wt % or less, 2.0 wt % or less, or even 1.0 wt % or less with wt % relative to composition weight.

Fillers can be desirable in the composition to modify rheological properties of the composition and/or modify mechanical properties of the composition after curing. Examples of suitable fillers include silica such as fumed silica, and quartz. Filler may be present at a concentration of zero wt % or more, one wt % or more, 5 wt % or more, 10 wt % or more, 15 wt % or more, even 20 wt % or more while at the same time are typically present at a concentration of 30 wt % or less, 20 wt % or less, 10 wt % or less or even 5 wt % or less with wt % relative to composition weight.

Examples

Table 1 lists the components used in the following Examples (Exs) and Comparative Examples (Comp Exs). "Vi" refers to vinyl groups ($—CH{=}CH_2$).

TABLE 1

| Component | Description | Source |
|---|---|---|
| SiH Terminated Siloxane 1 | A polysiloxane having the following average molecular structure: $(CH_3)_2HSiO—((CH_3)_2SiO)_{120}—OSiH(CH_3)_2$ | Commercially available under the name XIAMETER ™ OFX-5567 from The Dow Chemical Company ("TDCC"). |
| Vinyl Terminated Siloxane 1 | A polysiloxane having the following average molecular structure: $(CH_3)_2ViSiO—((CH_3)_2SiO)_{310}—OSiVi(CH_3)_2$ | Available under the name XIAMETER RBL-9117 from TDCC. |
| Vinyl Terminated Siloxane 2 | A polysiloxane having the following average molecular structure: $(CH_3)_2ViSiO—((CH_3)_2SiO)_{158}—OSiVi(CH_3)_2$ | Available under the name XIAMETER RBL-9119 from TDCC. |
| Karstedt's catalyst | Organoplatinum compound derived from divinyl-containing disiloxane dispersed in polydimethylsiloxanes silicone oil to form a composition with a concentration of 0.5 wt % platinum | Available under the name SYL-OFF ™ 4000 Catalyst from TDCC. |
| Tetrakis-dimethylvinyl siloxy silane | A siloxane have the following structure: $Si(OSiVi(CH_3)_2)_4$ | Synthesize according to teachings in U.S. Pat. No. 6,806,339. |
| Methacrylate Converter | Methacryloxypropyl-tetramethyldisiloxane $H(CH_3)_2Si—OSi(CH_3)_2—(CH_2)_3—OC(O)C(CH_3)CH_2$ | Synthesize according to teachings in U.S. Pat. No. 10,280,265 |
| ETM Converter | Ethylenetrimethoxysilyl-tetramethyldisiloxane $H(CH_3)_2Si—OSi(CH_3)_2—(CH_2)_2Si(OCH_3)_3$ | Synthesize according to teachings in U.S. Pat. No. 4,871,827 |

XIAMETER and SYL-OFF are a trademarks of The Dow Corning Corporation.

MIN-U-SIL is a trademark of U.S. Silica Company Corporation

Synthesis of Polyorganosiloxane Cluster Polymers ("CPs")

CP1: 90% Methacrylate/10% Ethylenetrimethoxysilyl Functionalized End Groups. Equip a 250 mL three-neck round bottom flask with a stir bar. Add to the flask 59.1 g of SiH Terminated Siloxane 1 and 13.0 g of tetrakis-dimethylvinylsiloxy silane. Stir the solution and heat to 60° C. Add to the heated solution 0.04 g of Karstedt's catalyst and continue stirring for one hour. Add 0.03 g of butylated hydroxytoluene followed by dropwise addition of 3.0 g of ETM Converter and then another 0.04 g of Karstedt's catalyst. Slowly add 24.9 g of Methacrylate Converter, which is accompanied by a temperature rise. Allow the composition to cool to 23-25° C. to obtain a CP1 product mix comprising cluster polymer CP1 and oligomers.

CP1 has the structure of Structure (I) where subscript n is 120, each R is methyl, each R' is $—(CH_2)_2—$, on average 90 mol % of the A groups are methacrylate with an associated R" that is $—(CH_2)_3—$ and 10 mol % of the A groups are trimethoxy silyl groups with an associate R" that is $—(CH_2)_2—$. The CP1 product mix further includes oligomers, the primary component of which has the following structure: $Si(—OSiR_2—R'—SiR_2OSi(R_2)—R''\text{-}A)_4$, where R, R', R" and A are as described for CP1. The CP1 product mix is approximately 12.8 wt % oligomers with a molar ratio of oligomers to CP1 that is approximately 2.2:1.

CP1 is capable of dual curing due to the presence of trimethoxysilyl (moisture curable) and methacrylate (UV curable) functionalities.

CP2: 70% Methacrylate/30% Ethylenetrimethoxysilyl Functionalized End Groups. Equip a 250 mL three-neck round bottom flask with a stir bar. Add to the flask 58.8 g of SiH Terminated Siloxane 1 and 12.9 g of tetrakis-dimethylvinylsiloxy silane. Stir the solution and heat to 60° C. Add to the heated solution 0.04 g of Karstedt's catalyst and continue stirring for one hour. Add 0.03 g of butylated hydroxytoluene followed by dropwise addition of 9.0 g of ETM Converter and then another 0.04 g of Karstedt's catalyst. Slowly add 19.3 g of Methacrylate Converter, which is accompanied by a temperature rise. Allow the composition to cool to 23-25° C. to obtain a CP2 product mix comprising cluster polymer CP2 and oligomers.

CP2 has the structure of Structure (I) where subscript n is 120, each R is methyl, each R' is $—(CH_2)_2—$, on average 70 mol % of the A groups are methacrylate with an associated R" that is $—(CH_2)_3—$ and 30 mol % of the A groups are trimethoxy silyl groups with an associate R" that is $—(CH_2)_2—$. The CP2 product mix further includes oligomers, the primary component of which has the following structure: $Si(—OSiR_2—R'—SiR_2OSi(R_2)—R''\text{-}A)_4$, where R, R', R" and A are as described for CP2. The CP2 product mix is approximately 12.8 wt % oligomers with a molar ratio of oligomers to CP2 that is approximately 2.2:1.

CP2 is capable of dual curing due to the presence of trimethoxysilyl (moisture curable) and methacrylate (UV curable) functionalities.

CP3: 50% Methacrylate/50% Ethylenetrimethoxysilyl Functionalized End Groups. Equip a 250 mL three-neck round bottom flask with a stir bar. Add to the flask 58.5 g of SiH Terminated Siloxane 1 and 12.9 g of tetrakis-dimethylvinylsiloxy silane. Stir the solution and heat to 60° C. Add to the heated solution 0.04 g of Karstedt's catalyst and continue stirring for one hour. Add 0.03 g of butylated hydroxytoluene followed by dropwise addition of 14.9 g of ETM Converter and then another 0.04 g of Karstedt's catalyst. Slowly add 13.7 g of Methacrylate Converter, which is accompanied by a temperature rise. Allow the composition to cool to 23-25° C. to obtain a CP3 product mix comprising cluster polymer CP3 and oligomers.

CP3 has the structure of Structure (I) where subscript n is 120, each R is methyl, each R' is $—(CH_2)_2—$, on average 90 mol % of the A groups are methacrylate with an associated R" that is $—(CH_2)_3—$ and 10 mol % of the A groups are trimethoxy silyl groups with an associate R" that is $—(CH_2)_2—$. The CP3 product mix further includes oligomers, the primary component of which has the following structure: $Si(—OSiR_2—R'—SiR_2OSi(R_2)—R''\text{-}A)_4$, where R, R', R" and A are as described for CP3. The CP3 product mix is approximately 12.8 wt % oligomers with a molar ratio of oligomers to CP3 that is approximately 2.1:1.

CP3 is capable of dual curing due to the presence of trimethoxysilyl (moisture curable) and methacrylate (UV curable) functionalities.

CP4: 30% Methacrylate/70% Ethylenetrimethoxysilyl Functionalized End Groups. Equip a 250 mL three-neck round bottom flask with a stir bar. Add to the flask 58.3 g of SiH Terminated Siloxane 1 and 12.8 g of tetrakis-dimethylvinylsiloxy silane. Stir the solution and heat to 60° C. Add to the heated solution 0.04 g of Karstedt's catalyst and continue stirring for one hour. Add 0.03 g of butylated hydroxytoluene followed by dropwise addition of 20.7 g of ETM Converter and then another 0.04 g of Karstedt's catalyst. Slowly add 8.2 g of Methacrylate Converter, which is accompanied by a temperature rise. Allow the composition to cool to 23-25° C. to obtain a CP4 product mix comprising cluster polymer CP4 and oligomers.

CP4 has the structure of Structure (I) where subscript n is 120, each R is methyl, each R' is $—(CH_2)_2—$, on average 30 mol % of the A groups are methacrylate with an associated R" that is $—(CH_2)_3—$ and 70 mol % of the A groups are trimethoxy silyl groups with an associate R" that is $—(CH_2)_2—$. The CP4 product mix further includes oligomers, the primary component of which has the following structure: $Si(—OSiR_2—R'—SiR_2OSi(R_2)—R''\text{-}A)_4$, where R, R', R" and A are as described for CP4. The CP4 product mix is approximately 12.8 wt % oligomers with a molar ratio of oligomers to CP4 that is approximately 2.1:1.

As shown in the data below, CP4 contains insufficient methacrylate groups to undergo the desired UV curing.

CP5: 10% Methacrylate/90% Ethylenetrimethoxysilyl Functionalized End Groups. Equip a 250 mL three-neck round bottom flask with a stir bar. Add to the flask 58.0 g of SiH Terminated Siloxane 1 and 12.7 g of tetrakis-dimethylvinylsiloxy silane. Stir the solution and heat to 60° C. Add to the heated solution 0.04 g of Karstedt's catalyst and continue stirring for one hour. Add 0.03 g of butylated hydroxytoluene followed by dropwise addition of 26.6 g of ETM Converter and then another 0.04 g of Karstedt's catalyst. Slowly add 2.7 g of Methacrylate Converter, which is accompanied by a temperature rise. Allow the composition to cool to 23-25° C. to obtain a CP5 product mix comprising cluster polymer CP5 and oligomers.

CP5 has the structure of Structure (I) where subscript n is 120, each R is methyl, each R' is $—(CH_2)_2—$, on average 10 mol % of the A groups are methacrylate with an associated R" that is $—(CH_2)_3—$ and 90 mol % of the A groups are trimethoxy silyl groups with an associate R" that is $—(CH_2)_2—$. The CP5 product mix further includes oligomers, the primary component of which has the following structure: $Si(—OSiR_2—R'—SiR_2OSi(R_2)—R''\text{-}A)_4$, where R, R', R" and A are as described for CP8. The CP5 product mix is approximately 12.8 wt % oligomers with a molar ratio of oligomers to CP5 that is approximately 2.1:1.

As shown in the data below, CP5 contains insufficient methacrylate groups to undergo the desired UV curing.

Synthesis of Linear Polyorganosiloxanes (LPs)

LP1: 90% Methacrylate/10% Ethylenetrimethoxysilyl Functionalized End Groups. Equip a 250 mL three-neck round bottom flask with a stir bar. Add to the flask 96.4 g of Vinyl Terminated Siloxane 2 and 0.4 g of ETM Converter. Then add 0.03 g Karstedt's catalyst and heat to 60° C. and stir for 10 minutes. Add to the heated solution 3.59 g of Methacrylate Converter and stir for another 20 minutes. Allow the composition to cool to 23-25° C. to obtain LP1. LP1 has the following average molecular structure:

$$B—(CH_2)_3—Si(CH_3)_2OSi(CH_3)_2—(CH_2)_2[O—Si(CH_3)_2]_{158}—(CH_2)_2—Si(CH_3)_2OSi(CH_3)_2—B$$

where, on average, 90 mol % of the B groups are methacrylate groups and 10 mol % of the B groups are ethlyenetrimethoxysilyl groups.

UV Curable Formulations

Prepare UV curable compositions using the following procedure, one composition for each of polysiloxanes CP1-CP5 and LP1.

Into a 50 mL dental cup add 20 g of one of the polysiloxanes and 0.4 g of 2-hydroxy-2-methylpropiophenone (commercially available under the name Darocur 1173 from Sigma Aldrich). Mix in a dental mixer at 2000 revolutions per minute for 45 seconds. To the mixture add 0.2 g of trimethoxy(methyl)silane commercially (available as DOWSIL™ SX 6070 silane from The Dow Chemical Company, DOWSIL is a trademark of The Dow Chemical Company). Mix in a dental mixer at 2000 revolutions per minute for 45 seconds. Add 0.06 g of titanium diisopropoxide bis(ethylacetoacetate) ("TDIDE") and again mix in a dental mixer at 2000 revolutions per minute for 45 seconds. Package the sample into a 30 cubic centimeter syringe and remove air from the sample by allowing bubbles to rise to the tip and ejecting out the air followed by capping immediately.

Evaluate how quickly each UV curable formulation performs on surface wetness as is cures using the following Cured Surface Wetness Evaluation procedure. Prepare a 0.889 millimeter (35 mil) thick film of each sample on a polytetrafluoroethylene sheet using a drawdown bar. Cure the film by UV light by placing the coated polytetrafluoroethylene sheet onto a conveyor belt of a Colight UV-6 oven and dose the sample film with 4 Joules per square centimeter of light with 300 milliWatts per square centimeter intensity UV light, corresponding to a 13.3 second exposure time Immediately afterwards evaluate for surface wetness/tackiness by contacting the surface of the film with a nitrile glove coated finger and swiping the nitrile glove coated finger over the film. If sample material transfers to the nitrile glove coated finger then the film is deemed to be wet/tacky (Fail). If no sample is transferred to the nitrile coated finger then the film is deemed to be dry/tack-free (Pass). If there is no transfer, but the film it tacky then the film is "marginal".

Table 2 presents the results of the Cured Surface Wetness Evaluation of the UV curable formulations. The ratios under the polysiloxane indicate the mole ratio of methacrylate to ethylenetrimethoxysilyl endcapping.

Table 2 also presents Cured Surface Wetness Evaluation of samples where the films were allowed to sit in the dark at 40-50% relative humidity rather than running through UV light exposure in order to evaluate how long it took until the surface became dry and tack-free by moisture curing. The time it took for the samples to develop a surface that is dry and tack-free is presented in Table 2.

TABLE 2

| Cure Conditions | CP1 (90/10) | CP2 (70/30) | CP3 (50/50) | CP4 (30/70) | CP5 (10/90) | LP1 (90/10) |
|---|---|---|---|---|---|---|
| UV Cured Surface Wetness Evaluation | Pass | Pass | Pass | Fail | Fail | Fail |
| Ambient moisture cure Wetness Evaluation | 4 days | 5-6 hours | 2 hours | 30-40 minutes | 30-40 minutes | (not measured) |

The data in Table 2 reveals that the cluster organopolysiloxanes UV cure to a dry/tack-free surface as long as methacrylate accounts for at least 50 mol % of the endcapping functionality in approximately 13.3 seconds under a 4 Joules per square centimeter UV exposure in air. The data also reveals that even when 90 mol % of the endcapping functionality is methacrylate the linear polysiloxane does not cure to a dry/tack-free surface under the same UV curing conditions. Hence, the cluster organopolysiloxanes of the present invention UV cure to a dry/tack-free surface more rapidly than linear polysiloxanes. Notably, the linear polysiloxane still had a wet surface after 12 Joules per square centimeter UV exposure (0.300 Watt per square centimeter exposure for 40 seconds).

Due to the presence of the methoxy end groups, the cluster organopolysiloxanes are also moisture curable. This is evident from the ambient moisture Cure Wetness Evaluation results, which illustrate the more methoxy groups present the faster the moisture cure resulted in a dry, tack-free surface.

What is claimed is:

1. A composition comprising a cluster organopolysiloxane having the following structure:

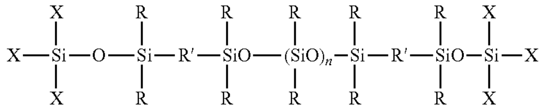

where:

(a)

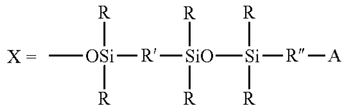

(b) R is independently in each occurrence selected from a group consisting of aryl groups and alkyl groups having from 2 to 6 carbons;

(c) R' and R" are independently in each occurrence selected from divalent hydrocarbon groups containing from 2 to 6 carbon atoms;

(d) the average n value for a sample is a value in a range of 50 to less than 200; and (e) A is independently in each occurrence selected from a group consisting of acrylate, methacrylate and trialkoxysilyl groups; provided that, on average, 50 to 95 mole-percent of the A groups are selected from acrylate and methacrylate groups and 5 to 50 mole-percent of the A groups are selected from trialkoxysilyl groups.

2. The composition of claim 1, where each R is a methyl.

3. The composition of claim 1, where each R' is $—(CH_2)_2—$ and each R" is $—(CH_2)_3—$ when connected to an A group that is acrylate or methacrylate and $—(CH_2)_2—$ when connected to an A group that is trialkoxysilyl.

4. The composition of claim 1, where the alkoxy groups of the trialkoxysilyl groups are independently in each occurrence selected from methoxy, ethoxy and propoxy.

5. The composition of claim 1, where each R is methyl, each R' is $—(CH_2)_2—$ and each R" is $—(CH_2)_3—$ when connected to an A group that is acrylate or methacrylate and $—(CH_2)_2—$ when connected to an A group that is trialkoxysilyl, and each alkoxy group of the trialkoxysilyl groups is methoxy.

6. The composition of claim 1, where the composition further comprises oligomers and/or by-products where the oligomers have the following structure:

$$Si(—OSiR_2—R'—SiR_2OSi(R_2)—R''\text{-}A)_4$$

and the by-products have the following structure:

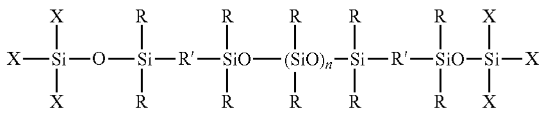

where 95 mole-percent or more and at the same time less than 100 mol-percent of the X groups have the following structure:

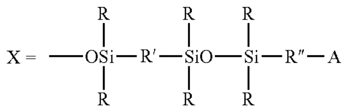

and where greater than zero mol-percent and at the same time 5 mole-percent or less of the X groups have the following X' structure:

$$X'=—OSiR_2—R'^{a}$$

where R, R', R", A, X, n are as previously defined, $R'^{a}$ corresponds to a monovalent terminally unsaturated precursor to R' formed by removing a hydrogen from a carbon adjacent to a terminal carbon of R' and forming a double bond between that carbon and the terminal carbon.

7. The composition of claim 1, wherein the composition is a curable composition that further comprises an ultraviolet light activated free radical initiator.

8. The composition of claim 7, wherein the composition further comprises a moisture cure catalyst.

9. A method of using the composition of claim 7 comprising applying the composition to a substrate and then exposing the composition to ultraviolet light to form an article comprising the cured composition.

10. An article comprising the composition of claim 1 on a surface of a substrate.

11. The article of claim 10 where the composition is in a cured state.

* * * * *